United States Patent
Fitch et al.

(10) Patent No.: US 7,653,144 B2
(45) Date of Patent: Jan. 26, 2010

(54) GAUSSIAN FSK MODULATION WITH MORE THAN TWO MODULATION STATES

(75) Inventors: Michael R Fitch, Felixstowe (GB); Jason S Flynn, Felixstowe (GB)

(73) Assignee: British Telecommunications public limited company, London (GB)

( * ) Notice: Subject to any disclaimer, the term of this patent is extended or adjusted under 35 U.S.C. 154(b) by 883 days.

(21) Appl. No.: 10/503,062

(22) PCT Filed: Jan. 16, 2003

(86) PCT No.: PCT/GB03/00186

§ 371 (c)(1),
(2), (4) Date: Jul. 30, 2004

(87) PCT Pub. No.: WO03/069867

PCT Pub. Date: Aug. 21, 2003

(65) Prior Publication Data

US 2005/0105643 A1  May 19, 2005

(30) Foreign Application Priority Data

Feb. 12, 2002 (EP) .................. 02250960
Dec. 19, 2002 (GB) .................. 0229623.4

(51) Int. Cl.
*H04L 27/10* (2006.01)
(52) U.S. Cl. .................................. 375/272
(58) Field of Classification Search ............... 375/259, 375/269, 272, 264, 286, 303, 313, 334, 340, 375/263, 290, 295, 316, 323, 335, 336, 337; 332/100, 117; 329/300

See application file for complete search history.

(56) References Cited

U.S. PATENT DOCUMENTS

| | | | | |
|---|---|---|---|---|
| 4,757,519 A | * | 7/1988 | Collison et al. | 375/296 |
| 5,379,324 A | * | 1/1995 | Mueller et al. | 375/340 |
| 5,602,868 A | * | 2/1997 | Wilson | 375/219 |
| 5,615,302 A | * | 3/1997 | McEachern | 704/209 |
| 5,710,797 A | * | 1/1998 | Segal et al. | 375/346 |

(Continued)

FOREIGN PATENT DOCUMENTS

EP  0540232 A2  5/1993

(Continued)

OTHER PUBLICATIONS

Horikoshi et al., "Error Performance Improvement of Bandlimited QTFSK Assisted by an Efficient Coded Modulation and Viterbi Sequence Estimation", Proceedings of the Vehicular Technology Conference, Stockholm, Jun. 8-10, 1994, New York, IEEE, US, vol. 2, Conf. 44, pp. 1006-1010.

(Continued)

*Primary Examiner*—Sam K Ahn
(74) *Attorney, Agent, or Firm*—Nixon & Vanderhye P.C.

(57) ABSTRACT

A wireless data transmission system uses modulation onto a multi-level symbol, so that a multi-level frequency shifted signal can be generated. By using a Gaussian filter, inter-symbol interference can be introduced. The demodulation process makes use of templates corresponding to each of the possible symbol transitions, so that knowledge of previously decoded symbols can be used to decode the next one.

9 Claims, 4 Drawing Sheets

U.S. PATENT DOCUMENTS

| | | | | |
|---|---|---|---|---|
| 5,738,104 | A * | 4/1998 | Lo et al. | 600/521 |
| 5,802,112 | A * | 9/1998 | Ganter | 375/260 |
| 5,864,585 | A * | 1/1999 | Erisman | 375/272 |
| 6,026,131 | A * | 2/2000 | Laurent et al. | 375/345 |
| 6,438,176 | B1 * | 8/2002 | Haran et al. | 375/303 |
| 6,487,240 | B1 * | 11/2002 | Chen | 375/219 |
| 6,665,348 | B1 * | 12/2003 | Feher | 375/259 |
| 6,757,334 | B1 * | 6/2004 | Feher | 375/259 |
| 6,836,515 | B1 * | 12/2004 | Kay et al. | 375/260 |
| 7,072,414 | B1 * | 7/2006 | Lui et al. | 375/274 |
| 7,382,717 | B2 * | 6/2008 | Park | 370/203 |
| 2001/0017724 | A1 * | 8/2001 | Miyamoto et al. | 359/158 |
| 2003/0215000 | A1 * | 11/2003 | Hansen | 375/130 |
| 2004/0001560 | A1 * | 1/2004 | Darabi | 375/303 |
| 2004/0257992 | A1 * | 12/2004 | Dottling et al. | 370/230 |
| 2005/0204252 | A1 * | 9/2005 | Aramaki et al. | 714/748 |
| 2005/0232140 | A1 * | 10/2005 | Proctor et al. | 370/208 |
| 2006/0212904 | A1 * | 9/2006 | Klarfeld et al. | 725/46 |

FOREIGN PATENT DOCUMENTS

| | | |
|---|---|---|
| EP | 1189380 A2 | 3/2002 |
| EP | 1204256 A1 | 5/2002 |
| FR | 2724522 A | 3/1996 |
| GB | 2342547 A | 4/2000 |
| WO | WO 01/99367 A1 | 12/2001 |

OTHER PUBLICATIONS

Proakis, "Digital Communications—Third Edition", 1995, Mc-Graw Hill International Editions, New York, NY, USA XP002234774, p. 190.

Aulin et al., "Detection Performance of Band-Limited Continuous Phase Modulation", Global Telecommunications Conference, Miami, Nov. 29-Dec. 2, 1982, New York, IEEE US, vol. 3, Conf. 1982, pp. 1119-1125.

Bellini et al., "Partial Response Digital Frequency Modulation with Non-Coherent Detection in Regenerative Satellite FDMA Links", Links for the Future, Amsterdam, May 14-17, 1984, International Conference on Communications, Amsterdam, North-Holland, NL, vol. 2 May 1984, pp. 937-940.

Papke et al., "Combined Multilevel Turbo-Code with MR-Modulation", Proceedings of the ICC, vol. 2, Jun. 18-22, 1995, pp. 668-672, XP000533098, New York, NY, USA.

UK Search Report.

International Search Report.

European Search Report.

Horikoshi et al, "Error Performance Improvement of Bandlimited QTFSK Assisted by an Efficient Coded Modulation ADN Viterbi Sequence Estimation", Proceedings of the Vehicular Technology Conference, Stockholm, Jun. 8-10, 1994, New York, IEEE, US, vol. 2 Conf. 44, Jun. 8, 1994, pp. 1006-1010.

Proakis, "Digital Communications—Third Edition", 1995, Mc-Graw Hill International Editions, New York, NY, USA , pp. 190, 192, 284, 286, 287 and 289.

* cited by examiner

GAUSSIAN FSK MODULATION WITH MORE THAN TWO MODULATION STATES

This application is the US national phase of international application PCT/GB03/00186 filed 16 Jan. 2003 which designated the U.S. and claims benefit of EP 02250960.8, dated 12 Feb. 2002 and GB 0229623.4 dated 19 Dec. 2002, the entire content of each of which is hereby incorporated by reference.

BACKGROUND

1. Technical Field

This invention relates to the transmission of data over high data-rate point-to-point and point-to-multipoint radio links. Such links are used in many different configurations, using radio transmitter and receivers which may be fixed or mobile, terrestrial or in orbit.

2. Related Art

The major limitations on capacity are available bandwidth and power, coupled with tight constraints on emissions outside the occupied bandwidth. These constraints require a capability to transmit data with high bandwidth efficiency while at the same time being tolerant both to equalisation error (amplitude and group delay) and to non-linearities (such as caused by saturated amplifiers).

There are several methods for increasing the information content of transmissions. These include the use of ever-greater bandwidth, as it becomes technically feasible by making use of higher carrier frequencies. However, carrier frequencies are a scarce resource, and operators are not usually permitted to select a frequency of their choice. Higher frequencies also tend to be subject to greater attenuation and require greater power to generate and amplify.

Some systems, when required to transmit a signal requiring a higher data rate than a single channel can provide, are arranged to make use of two or more channels, each carrying part of the data.

Digital amplitude modulation systems may operate in a binary "on/off" (1/O) mode. To avoid loss of synchronisation with the carrier, it is usual to use two non-zero amplitudes. If these are positive and negative values (of the same or different magnitudes) they may be also considered as a phase shift: a "1" being indicated by a 180° shift in the phase of the carrier signal compared to the phase of a "zero". Other modulation schemes use other phase shifts, for example using multiples of 45 degrees—known as 8PSK (eight-phase shift keying), as is used in the current state-of-the-art Internet Service Provider (ISP) backbone connection market segment, using Trellis Coded Modulation modems fitting into a 72 MHz satellite transponder to produce a bit rate of 155 Mbit/s. The use of both phase and amplitude shifts is known as Quadrature Amplitude Modulation (QAM).

Such schemes allow several binary digits ("bits") to be transmitted together, for example a system using a so-called "constellation" of sixteen "symbols", each reprsented by a different phase/amplitude state, would allow each individual symbol to represent a different four-bit word. The number of modulation states required increases exponentially with the number of binary digits to be represented by each symbol. For ease of conversion, constellations are usually selected to have a number of symbols which is some power of two, so that each symbol can represent a group of binary digits (bits).

International Patent Specification WO02/17507 discloses a system in which data is transmitted in a plurality of channels (data streams), each of which has a multiple-level amplitude modulation system. By selecting the number of levels and the number of channels appropriately, a greater data rate can be achieved for a given bandwidth than using that bandwidth for a larger number of narrowband binary channels, or for a single wide band signal having a larger number of amplitude levels.

Instead of amplitude or phase, different symbols may be represented by different frequencies. This is known as frequency shift keying (FSK). In order to economise on bandwidth, the frequency shifts are generally selected to be the minimum necessary to be distinguishable from each other, (minimum shift keying or MSK). To avoid high frequency spectral spread, the frequency shifts are generally shaped such that the frequency shifts follow a smooth Gaussian waveform rather than a square wave shape: thus the system is known as Gaussian minimum shift keying (GMSK).

In any digital system the individual symbols used must be sufficiently different from each other to be distinguishable by the receiver. However, the greater such a difference is, the more bandwidth is required. It will be apparent that any system other than a simple binary system (or the special case of a 3PSK system) will require that some symbol transitions will be greater than others. The increase in speed obtained by a multiple-level system therefore requires either a greater carrier-to-noise ratio than a simple binary system in order to allow the different levels to be clearly distinguishable, or a greater bandwidth in order to accommodate the same minimum shift between phase/amplitude states. Efficiency of use of bandwidth is obtained only if the gain in speed is greater than the increase in bandwidth required to achieve it. In the case of frequency shift keying a multiple-level system would require an increase in bandwidth proportional to the number of symbols used, if the minimum difference between frequencies is to be maintained, so no advantage is gained compared with the use of a plurality of binary channels occupying the same bandwidth.

However, frequency shift keying has advantages in certain circumstances such as in satellite links, as the cost of setting up earth stations is affected by the required equalisation error across the signal bandwidth and this becomes more of an issue for wide-band signals and in particular for systems using phase shift keying. High tolerance to non-linearities in the channel is also desirable, as satellite channels include one or more elements in series that could be running close to or at saturation point. It is therefore desirable in such circumstances to optimise the bandwidth utilisation of FSK systems A prior art receiver described by Horikoshi et al in "Error Performance of Improvement of Bandlimited QTFSK Assisted by an Efficient Coded Modulation and Viterbi Sequence Estimation"—IEEE: Proceedings of the Vehicular Technology Conference, Stockholm, Jun. 8-10 1994 (New York) vol 2, conf 44, pages 1006-1010. In the receiver, discrete modulation states are detected by minimising the phase variance at a single decision point (by maximising a so-called "eye opening"), after equalisation has been applied to optimise the symbol shape.

BRIEF SUMMARY

According to an exemplary embodiment of the present invention, a frequency modulation system is employed in which a filtered waveform is frequency modulation system is employed in which a filtered waveform is frequency modulated onto a carrier, characterized in that there are more than two modulation states, and the impulse response of the filter extends over adjacent symbols.

According to another aspect there is provided a signal transmitter comprising means for frequency modulating a digital signal onto a carrier, comprising means for converting the signal into a series of symbols having more than two modulation states, and a partial response filter in which the impulse response of the filter extends over adjacent symbols.

The use of a 'partial response' system, in which the next symbol starts before the channel has finished responding to the previous symbol, in combination with multiplelevel (i.e. non-binary) symbols allows particularly efficient use of bandwidth. A Gaussian filter, such as is used in the embodiment to be described, gives a well-behaved impulse response, but other filter types may also be suitable.

This modulation process will be referred to in the following as multiple-level Gaussian filtered frequency shift keying (MGFSK). In the embodiment to be described sixteen ($2^4$) levels are used, giving four user bits per symbol (uncoded) but other numbers of levels can be used. The use of a filter whose impulse response stretches over adjacent symbols enables a reduction in occupied bandwidth at the expense of some inter-symbol interference (ISI) and loss of orthogonality. The bandwidth of a modulator output Bo can be approximated to Bo=2B(1+β), where β is a dimensionless value defined as the peak frequency deviation divided by the frequency B of the baseband (modulating) signal. Consequently, the amount of deviation has to be taken into account when calculating the modulated bandwidth. This is known as Carson's rule. However, the Gaussian waveform allows the individual levels to be better discriminated than would be the case for other waveforms, allowing the occupied bandwidth to be in the narrowband class, using a low value for the modulation index (β). If the index is β<1, the expression above approximates to Bo=2B.

According to further aspects, the invention provides a signal generated according to this process, and to a demodulation process for demodulating such a signal, wherein the identification of the symbol is made by measuring its shape from samples taken along its length. In the preferred arrangement identification of the symbol is made by identifying properties of the channel measured from analysis of the channel's response to predetermined impulses. In this invention, unlike the prior art system referred to above, the shape of the incoming symbol is not altered, but instead several samples are taken over the duration of the symbol in order to determine its shape and the samples are used in the symbol recovery and detection process. The invention also extends to a receiver for receiving and demodulating such a signal, comprising a symbol detector wherein the identification of each symbol is made by measuring its shape from samples taken along its length. The preferred embodiment uses properties of the radio channel measured from analysis of the channel's response to predetermined impulses. Where a two-way connection is required, such a receiver may be combined with a transmitter according to the invention to form a single transceiver, to co-operate with a similar transceiver at the remote end of the two-way link.

Within the demodulator, it is necessary to identify the symbol that was sent by the transmitter. According to a preferred aspect of this invention, the demodulation is performed by means of look-up tables designed after measuring the channel impulse response. Preferably analysis is made using samples predominantly from the first half of each symbol, since in this region intersymbol interference is dominated by the effects of previous symbols whose values are known, and later, unknown symbols have less effect. The identification of the symbol can advantageously make use of information relating to one or more of the previously demodulated symbols. For this purpose the symbol detector may comprise a store for the identity of one or more previous symbols, and means for retrieving the said identity from the store for use in analysis of the current symbol. The receiver may also comprise a store of values of symbol transitions, and comparison means for determining the value of the present symbol by comparison with the stored values and the value of the previous symbol or symbols.

The combination of multiple levels and partial response signalling results in an improved bandwidth efficiency. For example, in the embodiment to be discussed later a value of E (bit rate/occupied bandwidth) of almost 6 bits/sec/Hz is achieved which is equivalent to a 64-level QAM (Quadrature Amplitude Modulation) system Because it uses frequency modulation (as opposed to phase-shift keying), the signal is more tolerant to group delay error in the channel. Being an FM signal also means that it has a constant envelope, unlike an amplitude modulation signal, so that it is more tolerant to non-linearities including the amplitude variations caused by equalisation errors and by amplifier stages operating at or near saturation.

There is a penalty for using FM, as it results in inferior noise performance when compared to the PSK and QAM schemes but this can be mitigated by additional processing as explained later.

The noise performance of the demodulator may be enhanced by optimising the positions where samples are taken of the received waveform and also by averaging the demodulation over several symbols (typically from 3 to 8) and then performing decision feedback to determine the symbols received.

There is considerable scope to improve the noise performance through the use of digital processing and pattern recognition techniques. Whereas the QAM schemes rely on matched filtering and accurate sampling points, and demodulate symbol by symbol, the present invention works by recognising impulse responses spread over two or three symbols. Because the new scheme uses FM, it can be assumed to be linear even though the channel may be highly non-linear to amplitude and phase.

BRIEF DESCRIPTION OF THE DRAWINGS

An embodiment of the invention will now be described with reference to the drawings, in which.

DETAILED DESCRIPTION OF EXEMPLARY EMBODIMENTS

Figure 1:
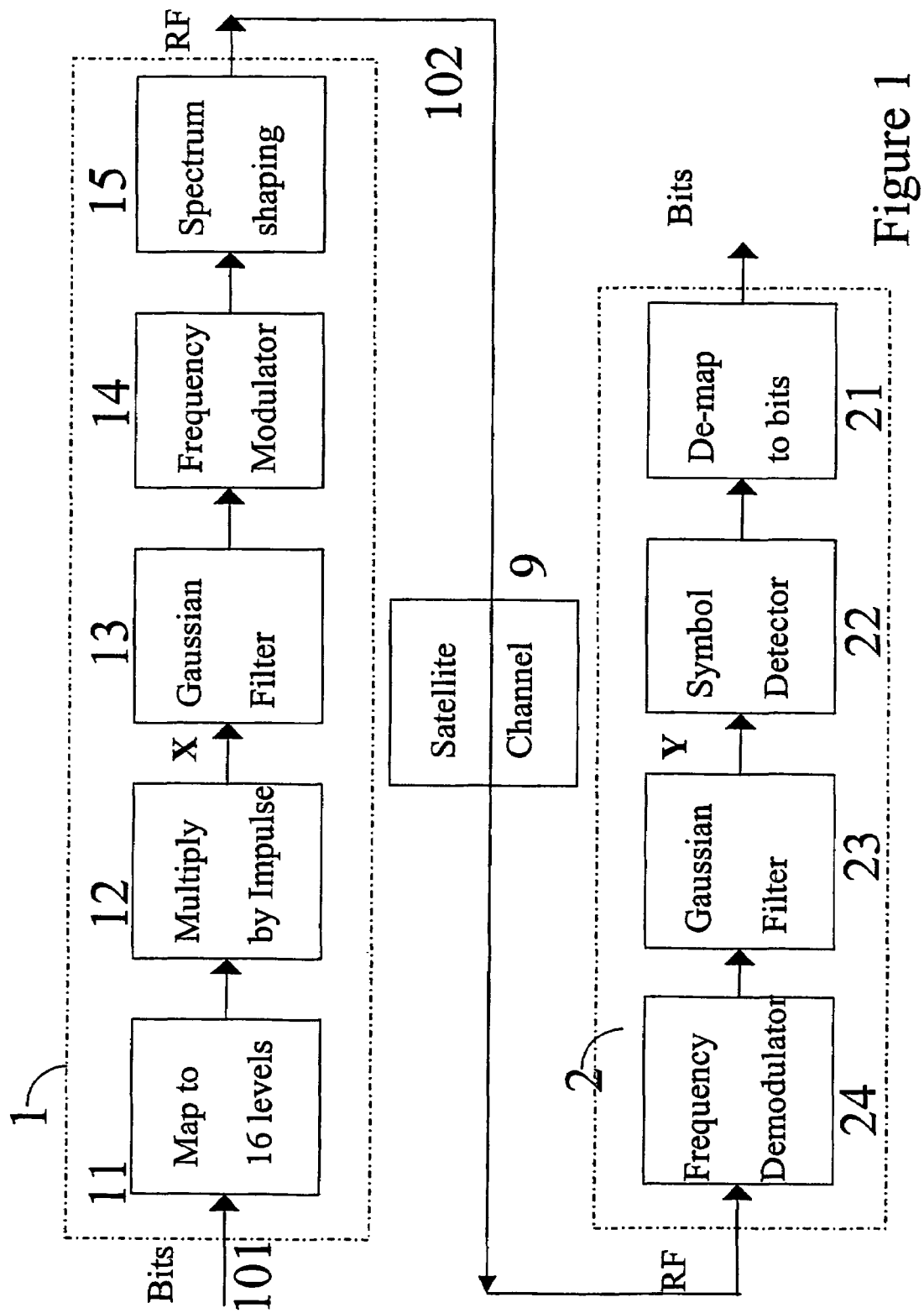
FIG. 1 is a diagrammatic representation of the modulation and demodulation processes

A general block diagram of the modulation and demodulation processes is shown in FIG. 1.

The modulator section 1 in the upper part of FIG. 1 begins with a mapping process 11, mapping the input bits 101 to an alphabet of sixteen symbols, which equates to four bits per symbol. The sixteen symbols are represented by different amplitudes symmetrical about zero, for example −7.5, −6.5, −5.5 . . . −0.5, +0.5 . . . +5.5, +6.5, +7.5. These are multiplied by impulses of value 1 (step 12) to produce impulses of −7.5, −6.5 . . . +6.5, +7.5 at the point labelled 'X' in FIG. 1, which acts as an input to the filtering process, which uses a Gaussian filter 13. The Gaussian shape of the response to the impulses generated in the previous step 12 has smooth excursions with no negative or oscillatory characteristics. This output is next applied to the frequency modulator 14. This method of modulation is very similar to the scheme used by the GSM cellular telephone system air interface, except that GSM uses only two levels (+1 and −1). The bandwidth B of the low-pass Gaussian filter 13 is a critical parameter: if it is set too small the occupied bandwidth Bo in the output channel 9 is reduced (since as already explained, the two are proportional to each other) but the intersymbol interference is increased since it sets the width (in time) of the impulse response. In the present embodiment, the value BT, which is the non-dimensional product of the filter −6 dB bandwidth (B) and the symbol period (T), has been set at 0.35, although it could be varied as part of an optimisation process. GSM uses a value of BT=0.3. As the value BT is increased, the filter bandwidth increases and the bandwidth of the modulated signal also increases.

The spectrum at the output of the FM modulator 14 is characterised by overlaid Bessel coefficients of the first order, dependent on the instantaneous frequency and level of the baseband input. The spectrum of the FM signal consequently drops off more gently than it does with PSK modulation and in fact it becomes approximately Gaussian in shape when a random source is applied instead of a simple tone. Root raised-cosine filters, used in conventional PSK schemes without an additional stage of modulation, have spectra that are quite rectangular in nature which is very desirable for packing. However, such filters are not suitable for the present FSK system because they have an oscillatory impulse response. Moreover, in the present system and because it is not only the baseband filter 13 that is creating the output spectrum shape but also the action of the FM modulator 14 itself.

A spectrum shaping process 15 is next applied to the output of the modulator 14.

The shaped spectrum is then transmitted as an FM signal 102 over a radio frequency channel 9 to a receiver, where it is demodulated as follows.

The Demodulator 2 consists of an FM demodulator 24, a filter 23, a symbol detector 22 and a de-mapping processor 21 as shown in FIG. 1. In this embodiment, the FM demodulator 24 is a Phase-lock loop (PLL) design, with a VCO sensitivity set the same as in the FM modulator 14 (about 6 Hz/V) and the low-pass loop filter −3 dB response is at 1 kHz. The carrier frequency from the modulator 1 is 2 kHz with a sampling frequency of 10 kHz; the loop filter is designed with zeros close to 2 kHz to give −80 dB response at this frequency, in order to suppress the carrier component.

If the only filter in the receiver were the loop filter of the FM demodulator 24 the noise bandwidth would be about 1 kHz; this is not consistent with the occupied bandwidth of the signal, which is less than 10 Hz. So a Gaussian filter 23 is provided to define the noise bandwidth, set at −3 dB bandwidth of 10 Hz and with 13 taps, the same length as the corresponding filter 13 in the modulator 1.

Figure 2:
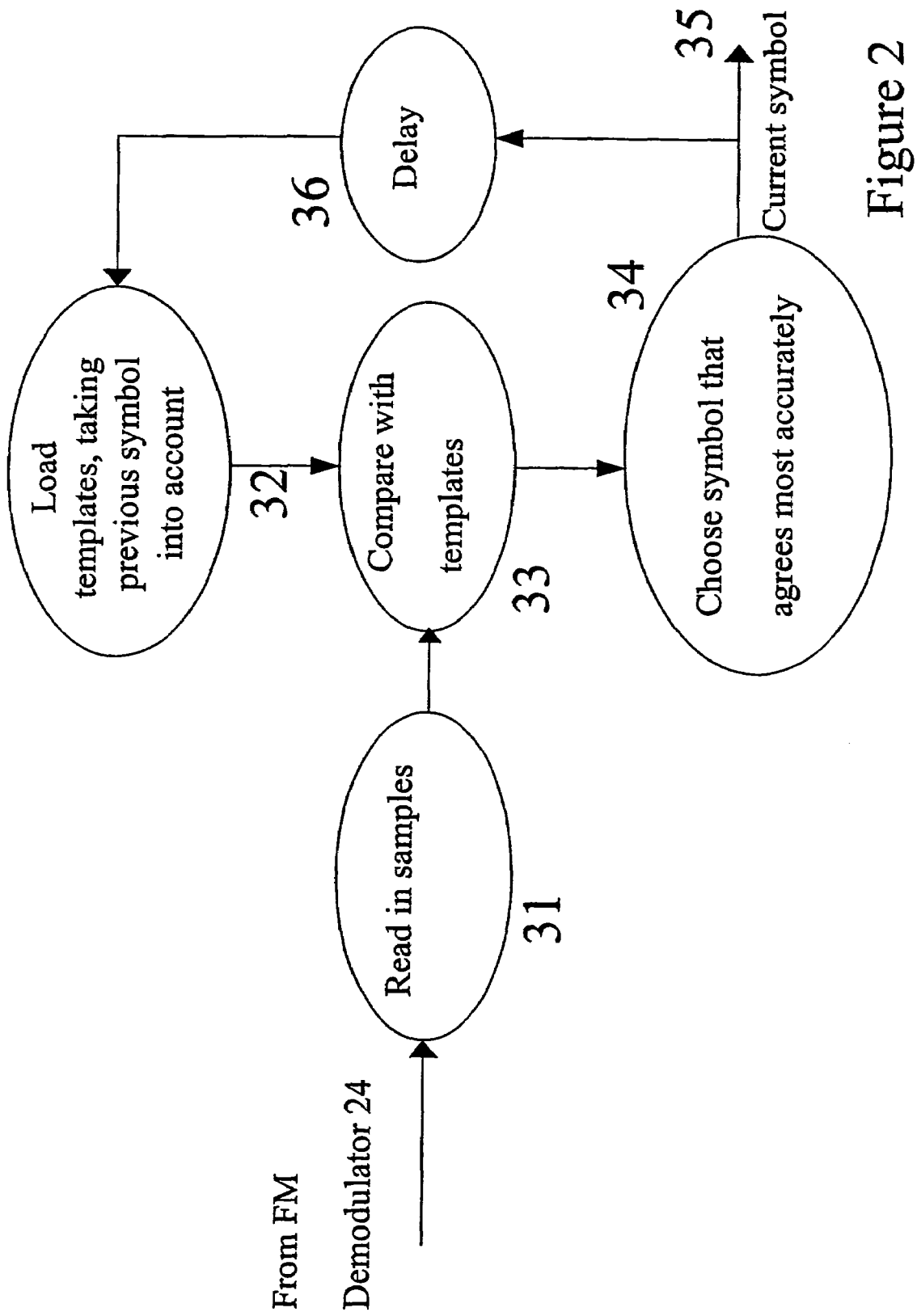
FIG. 2 is a more detailed block diagram illustrating the operation of the Detector step of FIG. 1

An illustration of the symbol detector process 22 is shown in FIG. 2. The detector 22 operates by recognising waveforms that occur when one symbol changes to the next. In the detector 22 one or more samples from the waveform delivered by the FM demodulator 23 are collected (step 31). These samples describe the approximate shape of the waveform. It has been found that four or five samples are enough to distinguish the waveform of one symbol from that of another.

Templates corresponding to each of the possible symbol transitions are retrieved from a store (32). The collected samples are compared with the retrieved templates (step 33), subtraction being performed on a sample-by-sample basis to obtain the errors between them. The closest match is selected (step 34), as indicated by the lowest error value, and the symbol transition corresponding to the template that scored the lowest error is thereby selected as an output 35. If more than one sample is taken for each symbol, the moduli of the errors for each sample are added up, and the lowest modulus sum is used.

As the identity of the previous symbol is known, only transitions from that symbol need to be tested for. Therefore the identity of the previous symbol (output 35) is also fed back, suitably delayed (step 36) to determine which transition templates are to be retrieved from the store 32.

With the waveforms generated as described above, the amount of energy that is spread from one symbol into the immediately adjacent symbols is significant, but the energy into symbols beyond is not considered significant, and so a memory of one symbol is adequate. Practical channels may turn out to have an impulse response that is more spread out, in which case energy may be spread into more remote symbols and memories of more than one symbol may be required.

Figure 3:
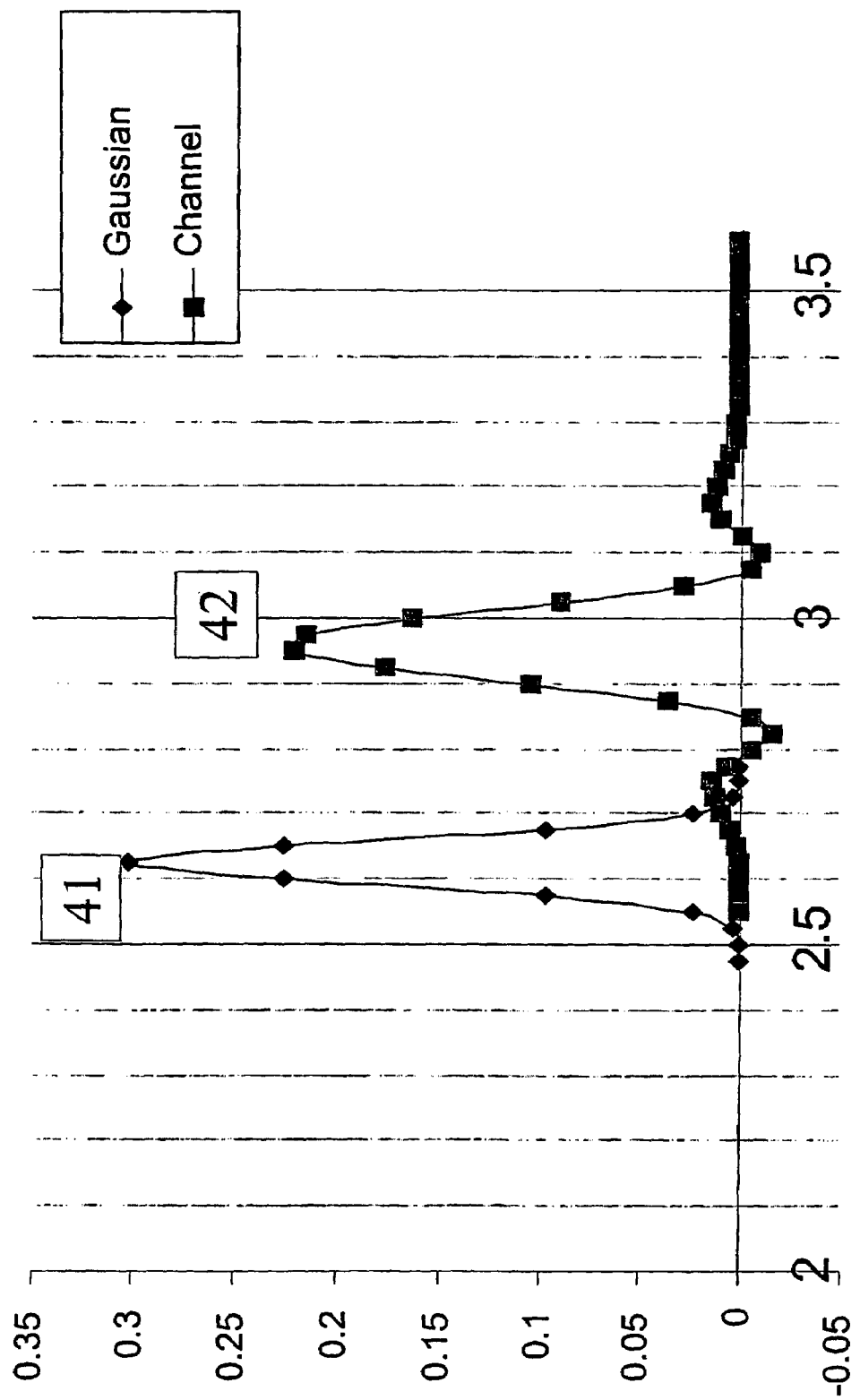
FIG. 3 illustrates the Impulse responses of a Gaussian filter alone, and of a less suitable filter for comparison

FIG. 3 illustrates this point. The symbol boundaries are at 0.1s (baud rate=10 Hz) along the x-axis. The first plot 41, centred at 2.62 seconds, is from a Gaussian filter of BT=0.35, as used in the modulator 13. and it can be seen that most of the impulse has its energy within the 0.1 s single symbol period, with only about 15% of the energy falling into adjacent symbols, and negligible energy in more remote symbols. The second plot 42 is from another channel filter, shown here for illustration purposes, and is much more spread out with roughly 35% of its energy in adjacent symbols and a further 15% in more remote ones.

Assuming that the channel impulse response can be kept narrow enough so that an insignificant amount of energy falls into symbols beyond the adjacent symbol, then a memory of one symbol is enough in the dedector, whereas the memory will need to be increased if the impulse response is unavoidably wide. The symbol detector complexity will increase exponentially with required symbol memory; as there are sixteen different symbols to be recognised, the transition can be from any of the sixteen to the same symbol, or to any other symbol of the sixteen. A detector with a memory of one symbol must therefore be able to recognise a set of $16^2$=256 patterns. If the memory is 'n' symbols, then the set size is $16^{(n+1)}$. However, in each case only sixteen templates need to be retrieved from the set for each symbol to be tested.

In the detector 22, the patterns are recognised by comparing them with templates in the form of look-up tables, so that 256 templates are available, loaded sixteen at a time depending on the identity of the previous symbol. If the memory needs to be increased to two symbols, then 4,096 templates will need to be made available, loaded sixteen at a time depending on the previous two symbols. This complexity puts considerable demands on the speed of the electronics. Once the last sample for a given symbol has been analysed, and the identity of the symbol confirmed, the templates appropriate to that symbol then need to be loaded before the first sample of the following symbol can be analysed.

In a preferred system several samples are compared for each symbol.

Figure 4:
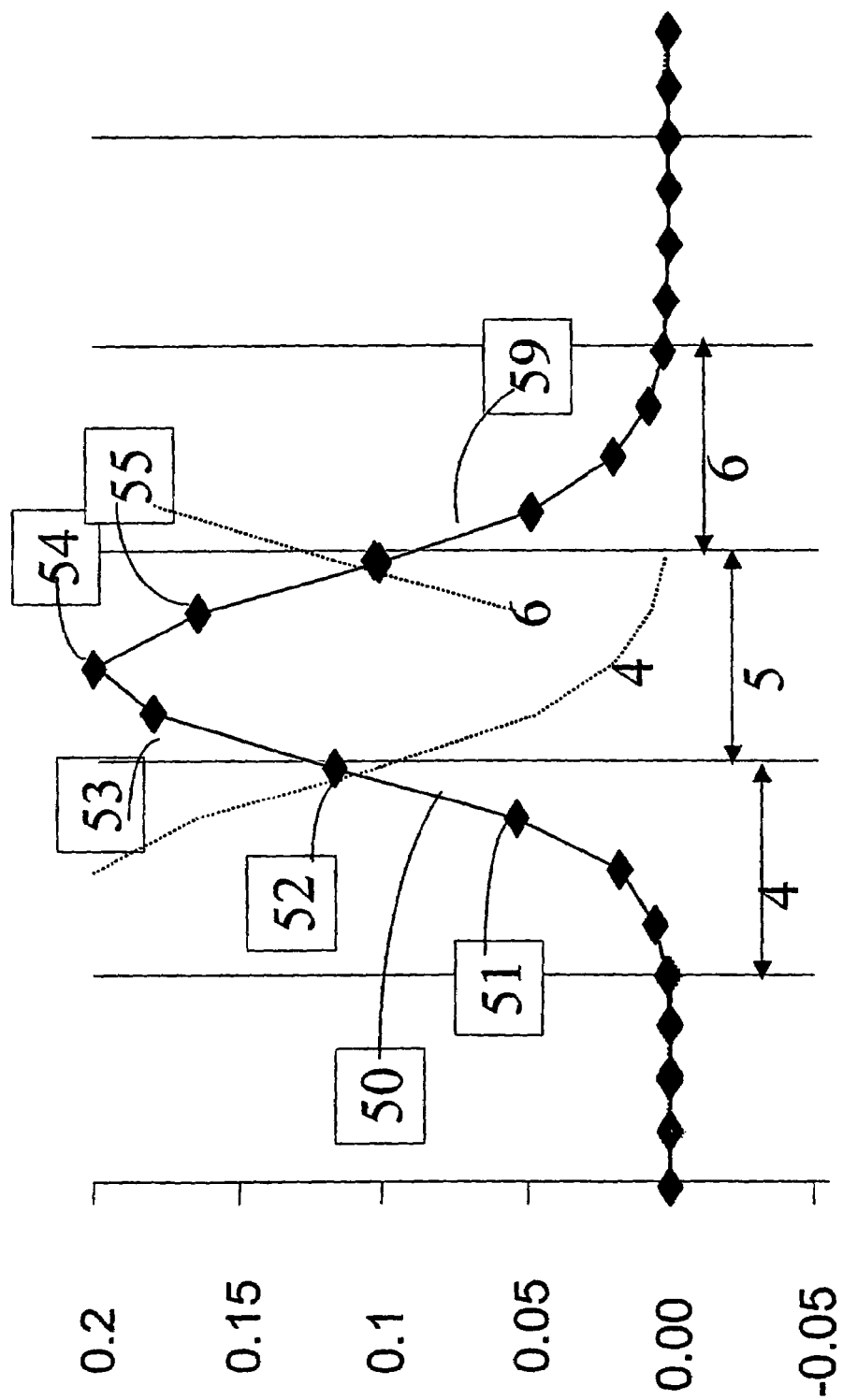
FIG. 4 illustrates the Unit impulse response from a practical channel

FIG. 4 shows an impulse response from a simulated channel, which consists of Gaussian filters in the modulator 13 and the demodulator 23, and channel equalisation error and non-linearities caused by a Solid State Power Amplifier (SSPA) in saturation. This response is a unit impulse response, obtained by inserting a value '1' for one sample into a model channel, followed by a large number of zeros. The entire set of look-up tables can now be constructed from the unit impulse response of the channel, since the channel is linear (because it uses FM), as will be explained later.

Any set of sampling points could be used to generate the look up table, but the points on the rising edge are preferred because the past is known but the future is not; this is explained as follows. In FIG. 4 the sampling rate is four times the symbol rate. However, as each symbols extends over a greater time than the notional symbol length, any given symbol will influence more than four samples.

It can be seen from FIG. 4 that the rising edge 50 of the impulse response for a symbol 5 of nominal duration (represented by the arrow 5), has samples 51, 52, 53, 54 at approximately y=0.05, 0.12, 0.17, and 0.20, the last (sample 54) being the peak value at the middle of the symbol.

The first sample 51, at y=0.05 actually falls within the previous symbol 4, and will be strongly affected by it, but the value of that symbol is known and is remembered by the detector and therefore the effect of that symbol 4 on this sample 51 is also known and can be allowed for. Part of a unit impulse response for this symbol 4 is shown. (This is the same as that for the present symbol 5, but displaced by one symbol period). Different values for this symbol will require different corrections to be allowed for.

Further up the impulse response, subsequent samples 52, 53, 54 are less affected by the previous symbol 4 because the impulse response from that symbol is dying away. At the top sample 54, the next symbol 6 has begun to arrive. Again, part of a unit impulse response corresponding to this following symbol 6 is shown, but, unlike the preceding symbol 4, the identity (value) of the following symbol 6 is of course unknown at this point.

On the falling edge 59 of the current symbol 5 this unknown following symbol 6 influences the values by an increasing extent, and so by the time of the next sample 55 this following symbol 6 has achieved about 10% of its energy. As this following symbol 6 is unknown, it is preferred to include no more than one sample 56 on the falling edge of the impulse response.

The entire set of templates can be built from the unit impulse response. This is because linearity is assumed; if an impulse of unit height is inserted at point 'X' on FIG. 1, the response at point 'Y' looks like the curve shown in FIG. 4. If an impulse of twice unit height is inserted, the response shown in FIG. 4 is multiplied by two, and so on. Linearity can be assumed to hold with this scheme even though the channel is highly non-linear, because FM is used over the channel—so that greater values of impulses result in greater frequency deviations and these are not affected by channel impairments.

Given a symbol period T, and a modulation system giving n bits per symbol, the effective bit rate is n/T bits/second By Carson's rule, as discussed above, the FM modulator output bandwidth $B_m$ approximates to twice the baseband bandwidth B: Bo=2B The bandwidth efficiency E is given by the number of bits per unit bandwidth per symbol period. The bit rate per unit baseband bandwidth is therefore E=n/BoT=n/2BT The number of levels (symbols) used in this embodiment is sixteen, so the number of binary digits (bits) per symbol n=4. The non-dimensional product BT of the filter −6 dB bandwidth (B) and the symbol period (T), was set at 0.35, so the bandwidth efficiency for this embodiment can therefore be determined as n/2BT=4/(2*0.35)=5.7 bits/sec/Hz, similar to that obtained with a 64-level QAM (Quadrature Amplitude Modulation) system.

What is claimed is:

1. A receiver for receiving and demodulating a frequency modulated signal comprising a series of signals having more than two modulation states represented by overlapped symbols, said receiver comprising:

a symbol detector for identifying each symbol, the symbol detector comprising, sampling means for taking samples from along the length of the signal, analysis means for comparing the shape of each signal sample with a set of signal templates to identify the template closest to the sample, a store for storing the identity of a first symbol, and retrieval means for retrieving said stored identity from the store for use in analysis of a current symbol.

2. A receiver according to claim 1, wherein said symbol detector uses properties of a radio channel carrying said signal, said properties being measured from analysis of the channel's response to predetermined impulses.

3. A receiver according to claim 2, wherein said analysis means uses samples predominantly from a first half of each received symbol.

4. A receiver according to claim 1, wherein said symbol detector comprises:

a store of values of symbol transitions, and comparison means for determining a value of a present symbol by comparison with stored values and the value of a previous symbol or symbols.

5. A process for modulating encoded digital signals onto an RF carrier, said process comprising:

mapping groups of input binary-valued digital signals to a corresponding one of more than two symbol values;

generating a sequence of impulse signals having values respectively corresponding to said symbol values and spaced apart by symbol time intervals T;

passing said sequence of impulse signals through a frequency-selective filter having a 6 dB bandwidth B, where the product BT is sufficiently small to cause substantial overlap in the time domain between impulse signals successively output from said filter; and frequency modulating an RF carrier signal with the over-lapped impulse signals output from said filter.

6. A process for de-modulating a frequency modulated RF carrier containing a sequence of modulated symbols having more than two possible states and having substantial overlap between adjacent symbols in the time domain, said process comprising:

frequency de-modulating said RF carrier to provide a sequence of substantially time-overlapped impulse signals having respectively corresponding symbol values;

sampling said de-modulated carrier multiple times to produce S samples during each symbol period T;

comparing said samples with stored templates of expected possible symbol impulse sample values; and using a result of said comparing step for at least one sample time Sp of a previous symbol period Tp to determine a symbol value for a current symbol period T.

7. A process as in claim 6 wherein said comparing step uses stored template values that have been selected based, at least in part, on a just previously identified symbol value.

8. A process as in claim 6 wherein substantially all samples of an incoming signal used to determine a symbol value for a current symbol period T are taken during or before the first half of the current symbol period T.

9. A process as in claim 6 wherein substantially all samples of an incoming signal used to determine a symbol value for a current symbol period T are taken during the last half of the prior symbol period Tp and the first half of the current symbol period T.

* * * * *